United States Patent
Yokoyama

(10) Patent No.: US 10,514,970 B2
(45) Date of Patent: Dec. 24, 2019

(54) METHOD OF ENSURING OPERATION OF CALCULATOR

(71) Applicant: TOYOTA JIDOSHA KABUSHIKI KAISHA, Toyota-shi, Aichi-ken (JP)

(72) Inventor: Masayuki Yokoyama, Takahama (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 15/784,474

(22) Filed: Oct. 16, 2017

(65) Prior Publication Data

US 2018/0137000 A1 May 17, 2018

(30) Foreign Application Priority Data

Nov. 15, 2016 (JP) .................................. 2016-222340

(51) Int. Cl.
*G06F 11/07* (2006.01)

(52) U.S. Cl.
CPC ...... *G06F 11/0757* (2013.01); *G06F 11/0721* (2013.01)

(58) Field of Classification Search
CPC ............. G06F 11/0757; G06F 11/0739; G06F 11/0772; G06F 11/1604; G06F 11/1433; G06F 11/3024; G06F 11/00

See application file for complete search history.

(56) References Cited

U.S. PATENT DOCUMENTS

| | | | | |
|---|---|---|---|---|
| 6,341,239 | B1 * | 1/2002 | Hayashi | G05B 19/0426 700/79 |
| 6,654,648 | B2 * | 11/2003 | Nada | B60K 6/365 700/19 |
| 9,563,493 | B2 * | 2/2017 | Wataru | G01R 31/00 |
| 9,748,064 | B2 * | 8/2017 | Sawano | G06F 1/24 |
| 2004/0254766 | A1 * | 12/2004 | Ito | G05B 19/0421 702/188 |
| 2008/0148107 | A1 * | 6/2008 | Takaishi | G06F 11/0739 714/51 |
| 2009/0076630 | A1 * | 3/2009 | Okamoto | G06F 8/60 700/7 |
| 2009/0198407 | A1 * | 8/2009 | Sakai | B60W 50/0205 701/29.1 |

FOREIGN PATENT DOCUMENTS

| | | |
|---|---|---|
| JP | 2009-184423 A | 8/2009 |
| JP | 2014-154043 A | 8/2014 |

* cited by examiner

*Primary Examiner* — Nadeem Iqbal
(74) *Attorney, Agent, or Firm* — Oliff PLC

(57) ABSTRACT

A method of ensuring operation of a calculator includes causing, by a CPU, the calculator to perform a predetermined operation verification calculation of which a correct value that is a resultant value in normal operation is set to ae predetermined value; acquiring, by the CPU, the resultant value of the calculation; referencing, by the CPU using a relative address referencing capability of the CPU, an address that is stored in an address acquired by adding the acquired resultant value to the starting address of the memory; and executing, by the CPU, a function stored at the referenced address.

6 Claims, 5 Drawing Sheets

METHOD OF ENSURING OPERATION OF CALCULATOR

INCORPORATION BY REFERENCE

The disclosure of Japanese Patent Application No. 2016-222340 filed on Nov. 15, 2016 including the specification, drawings and abstract is incorporated herein by reference in its entirety.

BACKGROUND

1. Technical Field

The disclosure relates to a method of ensuring operation of a calculator included in a microcomputer.

2. Description of Related Art

Various devices having microcomputers and executing high-level processes are widely used. For example, an electric control unit (ECU) is mounted in a vehicle. The ECU has one or more microcomputers and performs various vehicle controls. In order to maintain or improve reliability of such devices having microcomputers, various technologies that provide monitoring of operation of a microcomputer by another microcomputer are suggested.

A device that includes at least two microcomputers and a monitoring device, and monitors operation of a first microcomputer by each of a second microcomputer and the monitoring device is disclosed in Japanese Unexamined Patent Application Publication No. 2009-184423 (JP 2009-184423 A).

A device that monitors a processing load of a motor control microcomputer by a monitoring microcomputer and detects a transitional phenomenon leading to abnormality such as an increase in the processing load is disclosed in Japanese Unexamined Patent Application Publication No. 2014-154043 (JP 2014-154043 A).

A microcomputer can be configured in various forms at a functional level and an implementation level, and there are various ways of calling each constituent of the microcomputer. Basically, the microcomputer includes a memory that stores programs, data, and the like, a controller that, for example, accesses the memory, acquires and executes instructions, and communicates with external units, and a calculator that performs four fundamental arithmetic calculations, logical calculations, relational calculations, and the like.

SUMMARY

FIG. 4 is a functional block diagram related to one example of the device that monitors operation of the first microcomputer by each of the second microcomputer and the monitoring device according to the related art. A first microcomputer 910 is connected to a second microcomputer 920 and a monitoring integrated circuit (IC) 930. The first microcomputer 910 includes a first CPU 911, a first calculator 912, and a first memory 913. The second microcomputer 920 includes a second CPU 921, a second calculator 922, and a second memory 923. When the first CPU 911 operates normally, the first CPU 911 periodically transmits a watchdog pulse to the monitoring IC 930. The monitoring IC 930 includes a watchdog timer. For example, when the device is started, the monitoring IC 930 starts the watchdog timer. Each time the monitoring IC 930 receives the watchdog pulse, the monitoring IC 930 initializes the watchdog timer. When any abnormality occurs in the first microcomputer 910 and prevents the first CPU 911 from transmitting the watchdog pulse, or when the first CPU 911 detects abnormality in the first microcomputer 910 and stops transmitting the watchdog pulse, the watchdog timer is not initialized and causes a timeout, and the monitoring IC 930 transmits a reset signal to the first microcomputer 910. When the first CPU 911 receives the reset signal, the first CPU 911 resets the first microcomputer 910. The second microcomputer 920 monitors whether or not the first microcomputer 910 operates normally. When the second microcomputer 920 detects abnormal operation of the first microcomputer 910, the second microcomputer 920 transmits a reset signal to the first microcomputer 910 to reset the first microcomputer 910.

For example, the first microcomputer 910 and the second microcomputer 920 may be mounted in one ECU or may be respectively mounted in two ECUs. In either case, the method of monitoring operation of the first microcomputer 910 by the second microcomputer 920 has many constituents and performs communication between two microcomputers. Thus, configurations and processes are complicated, and many constraints are imposed on execution timing in order not to hinder the processes or communication for another functional operation. Therefore, operation of the first microcomputer 910 may not be sufficiently ensured. In addition, the number of microcomputers cannot be decreased, and cost reduction may not be achieved.

Operation of a microcomputer is most desirably ensured by the microcomputer. However, in the case of verifying a calculator included in the microcomputer, when verification of a calculation result uses a calculating capability of the calculator which is a verification target, the calculation result is not reliable, and operation of the calculator is not ensured. Thus, the verification has to use the calculator of another microcomputer.

The disclosure provides a method of ensuring operation of a calculator by a microcomputer including the calculator.

An aspect of the disclosure relates to a method of ensuring operation of a calculator executed by a CPU of a microcomputer including a memory, the calculator, and the CPU. In a state where the memory stores a function for normal operation that immediately returns to a caller, and a function for abnormal operation that performs a process for abnormal operation without using the calculator, where a first address of the memory acquired by adding a predetermined value to a starting address of an area of a predetermined size having a predetermined address as the starting address stores an address of the function for normal operation, and where all addresses of the memory other than the first address store an address of the function for abnormal operation, the method includes causing, by the CPU, the calculator to perform a predetermined operation verification calculation of which a correct value that is a resultant value in normal operation is set to the predetermined value; acquiring, by the CPU, the resultant value of the operation verification calculation performed by the calculator; referencing, by the CPU using a relative address referencing capability of the CPU, an address that is stored in an address acquired by adding the acquired resultant value to the starting address of the memory; and executing, by the CPU, a function stored at the referenced address.

According to the aspect of the disclosure, without comparing the resultant value of the calculator with the correct value by using a calculator of another microcomputer to determine whether or not the resultant value matches the correct value, the function for normal operation is executed when the resultant value of the calculator matches the correct value, and the function for abnormal operation is executed when the resultant value of the calculator does not match the correct value. Since measures such as resetting can be executed by the function for abnormal operation, normal operation of the calculator can be ensured without using the other microcomputer.

In the method according to the aspect of the disclosure, the process for abnormal operation may include jumping to a reset entry address for the microcomputer.

The aspect of the disclosure enables the microcomputer to be immediately reset in abnormal operation.

In the method according to the aspect of the disclosure, the microcomputer may periodically output a watchdog pulse before the process for abnormal operation is performed, and the process for abnormal operation may include stopping the output of the watchdog pulse.

The aspect of the disclosure enables the microcomputer in abnormal operation to receive a reset signal from a monitoring IC that monitors the watchdog pulse, thereby resetting the microcomputer. In addition, operation of the microcomputer can continue for a certain period of time before the resetting.

In the method according to the aspect of the disclosure, the process for abnormal operation may further include preventing interruption and entering an infinite loop.

The aspect of the disclosure enables the microcomputer in abnormal operation to receive a reset signal from a monitoring IC that monitors the watchdog pulse, thereby resetting the microcomputer. In addition, operation of the microcomputer can be immediately stopped.

In the method according to the aspect of the disclosure, the CPU in normal operation may be configured to periodically transmit the watchdog pulse to a monitoring IC including a watchdog timer, and the monitoring IC may reset the watchdog timer when the monitoring IC receives the watchdog pulse.

In the method according to the aspect of the disclosure, when the CPU stops transmitting the watchdog pulse, the watchdog timer may cause a timeout, and the monitoring IC may transmit a reset signal to the microcomputer.

The aspect of the disclosure enables provision of a method of ensuring operation of a calculator by a microcomputer including the calculator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The disclosure provides a method of ensuring operation of a calculator included in a microcomputer by the microcomputer. In the disclosure, a first address of an area having a predetermined size from a predetermined starting address in a memory stores an address of a function for normal operation, and other addresses of the area store an address of a function for abnormal operation. A CPU causes a calculator to perform an operation verification calculation as an operation verification process. Next, an address that is stored in the address acquired by adding the value of the calculation result to the starting address is referenced by using a relative address referencing capability of the CPU, and the function stored at the referenced address is executed. The first address is the address acquired by adding a correct value of the operation verification calculation to the starting address. When the result value of the calculator is equal to the correct value, the function for normal operation is executed. When the result value is not equal to the correct value, the function for abnormal operation is executed. As described above, when abnormality occurs in the calculator and generates a calculation result that is not equal to the correct value, the function for abnormal operation is executed to enable measures such as resetting, without comparing the calculation result with the correct value by using a calculator of another microcomputer to determine whether or not the calculation result matches the correct value. Thus, operation of the calculator can be ensured without using another microcomputer, and normal operation of the calculator can be ensured.

Hereinafter, one embodiment of the disclosure will be described in detail with reference to the drawings.

Figure 1:
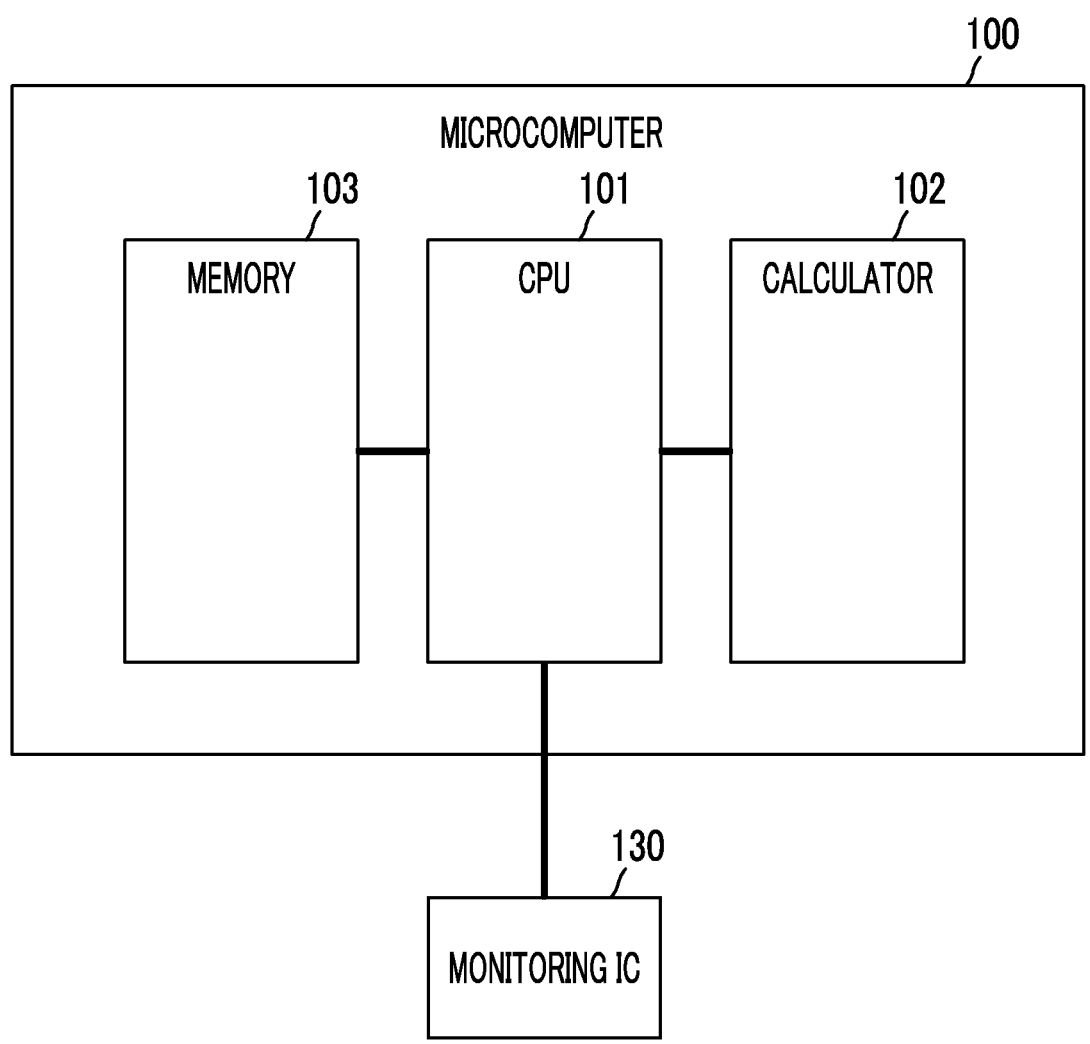
FIG. 1 is a functional block diagram of a device according to one embodiment of the disclosure.

FIG. 1 is a diagram illustrating functional blocks of an electronic device including a microcomputer 100 and a monitoring IC 130 according to the present embodiment. The microcomputer 100 includes a central processing unit (CPU) 101, a calculator 102, and a memory 103 that stores various types of data, programs, and routines (functions). The CPU 101 performs processes such as reading and writing the data of the memory 103, executing the programs (instructions), and communicating with an external device, not illustrated, connected to the microcomputer 100. In execution of the programs, the CPU 101, when needed, causes the calculator 102 to perform calculation and continues the process by using the result of calculation. In the present specification, the CPU 101 and the calculator 102 which is an operation verification target will be described as separate functional blocks as described above. That is, the CPU 101 refers to a part of the microcomputer 100 that functions as a controller performing reading and writing the data, executing the programs, communicating, and the like and does not function as the calculator 102. When the CPU 101 operates normally, the CPU 101 periodically transmits a watchdog pulse to the monitoring IC 130. The monitoring IC 130 includes a watchdog timer. When the monitoring IC 130 receives the watchdog pulse, the monitoring IC 130 resets the watchdog timer. When any abnormality occurs in the microcomputer 100 and prevents the CPU 101 from transmitting the watchdog pulse, or when the CPU 101 detects abnormality in the microcomputer 100 and stops transmitting the watchdog pulse, the watchdog timer causes a timeout, and the monitoring IC 130 transmits a reset signal to the microcomputer 100. When the CPU 101 receives the reset signal, the CPU 101 resets (initializes or restarts) the microcomputer 100.

Figure 3:
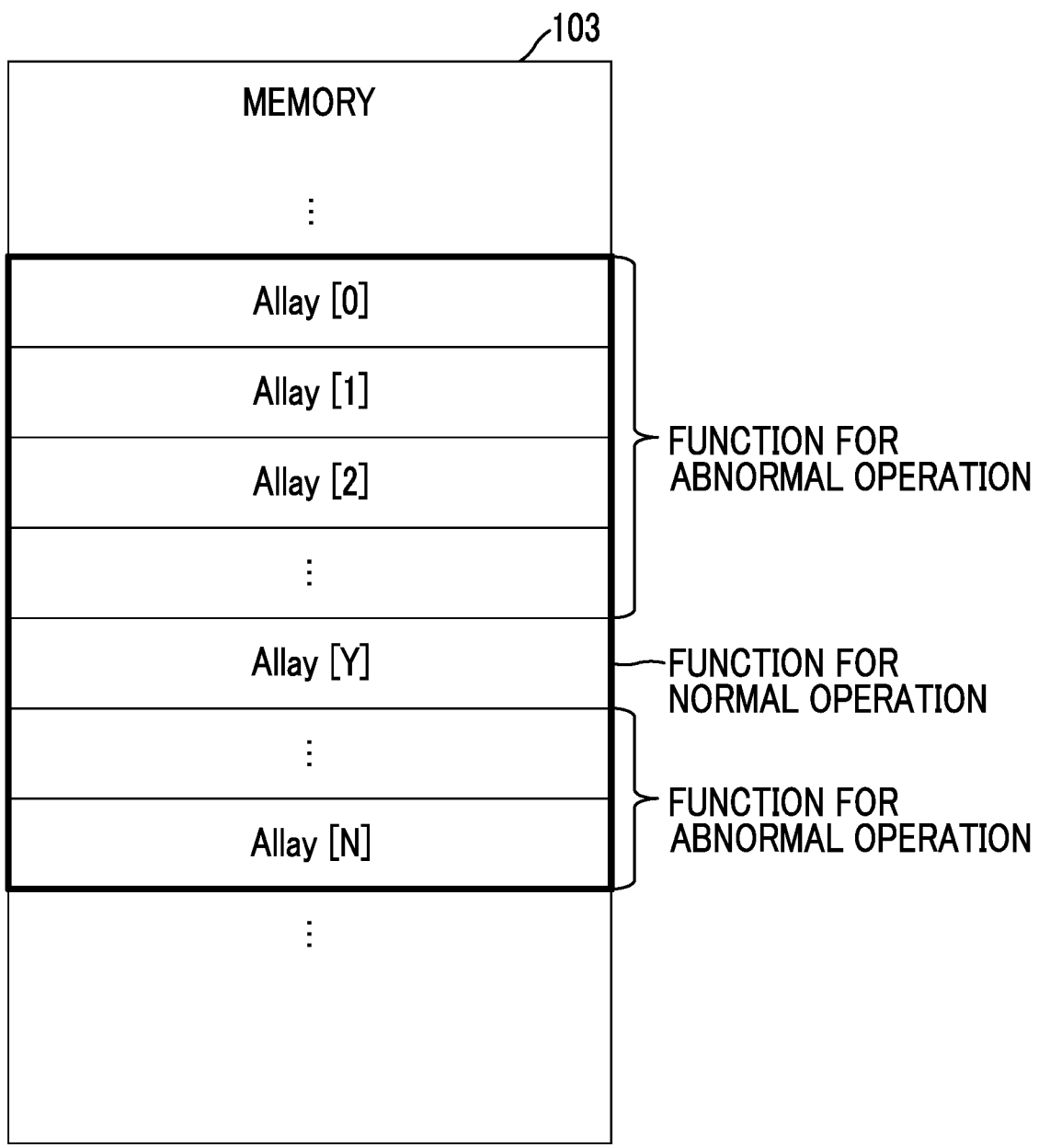
FIG. 3 is a diagram illustrating a data structure of an array according to the embodiment of the disclosure.

The memory 103 stores a program and data for the operation verification process. The program includes a function for normal operation and a function for abnormal operation described below. When an area of the memory 103 having a predetermined address range starting from a predetermined address is represented by an array Allay[n] (n=0, 1, 2, . . . , N), for a predetermined value of Y (any of 0, 1, 2, . . . , N), Allay[Y] (corresponds to the first address) stores the address value (function pointer) of the function for normal operation. All elements of Allay[0] to Allay[N] other than Allay[Y] store the address values (function pointers) of the function for abnormal operation that performs a process for abnormal operation. FIG. 3 schematically illustrates the structure of the array in the memory 103. Y is the correct value of a predetermined testing calculation f(x) (x is a predetermined parameter) described below.

The memory 103 may be a ROM and store programs and data in advance in a fixed area. The memory 103 may be a RAM, and the CPU 101 may dynamically secure an area in the RAM and appropriately load programs and data into the area from another memory or the like. When the memory 103 is a RAM, the CPU 101, for example, may secure an area for the array and load the address values immediately before execution of the operation verification process described below each time the operation verification process is executed, in order to secure reliability of the address values.

Figure 2:
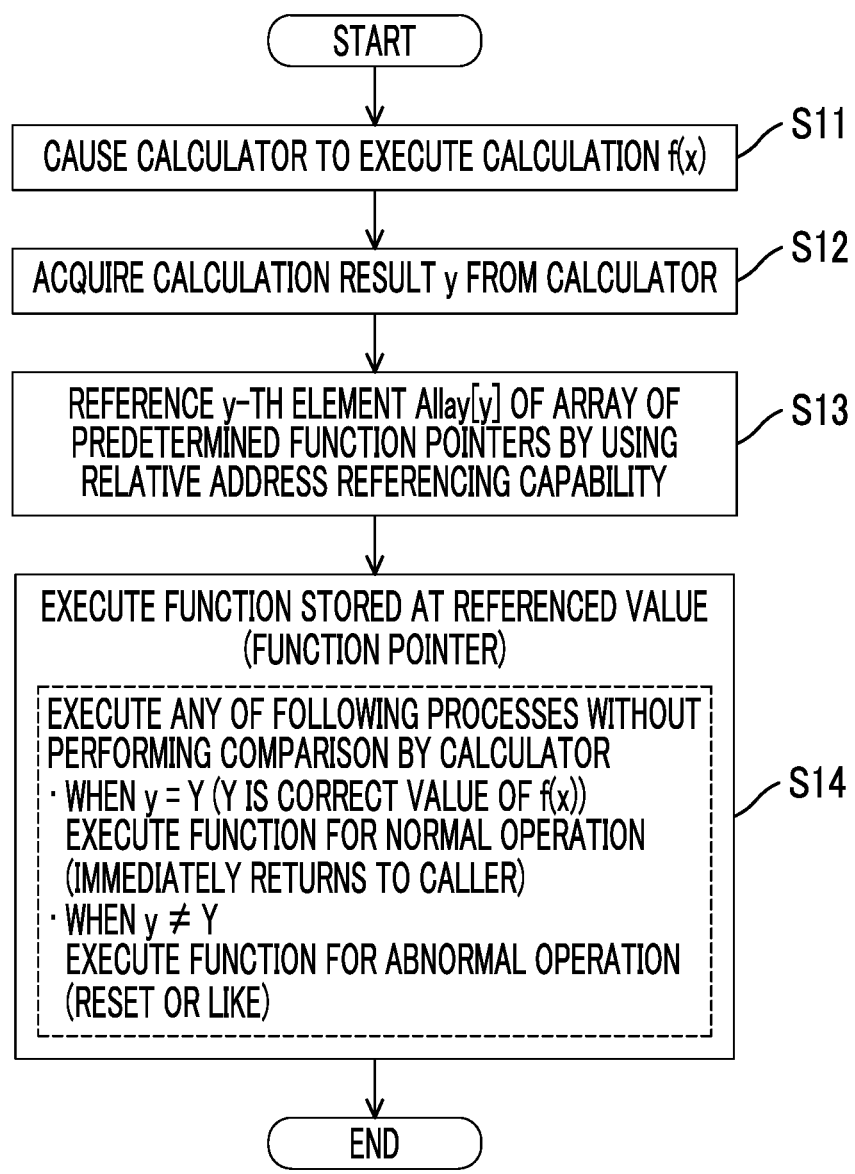
FIG. 2 is a flowchart of an operation verification process according to the embodiment of the disclosure.

FIG. 2 illustrates a flowchart representing a process executed by the CPU 101 of the microcomputer 100 in order to verify operation of the calculator 102 according to the present embodiment. Hereinafter, each step of the flowchart will be described.

[Step S11]: The CPU 101 causes the calculator 102 to execute the predetermined testing calculation f(x) (x is a predetermined parameter). The type of calculation, such as addition, subtraction, multiplication, division, bit shifting, and logical calculations, is determined in accordance with characteristics of the calculator 102 such that a calculation result other than the correct value is acquired when there is abnormality in a calculating capability of the calculator 102.

[Step S12]: The CPU 101 acquires a value y of the calculation result of the calculator 102.

[Step S13]: The CPU 101 references an address that is acquired by adding the value y of the calculation result to the predetermined address Allay[0] of the memory 103. That is, the CPU 101 references the value of the element Allay[y] of the array. The addition process is executed by using a relative address referencing capability of the CPU 101 and thus, can be executed without using the calculator 102.

[Step S14]: The CPU 101 executes a function of which the address is equal to the value of Allay[y] referenced in step S13. The CPU 101 jumps to the referenced function pointer. The function for abnormal operation includes a group of instructions that do not use the calculator 102, so that the function for abnormal operation can be executed even when there is abnormality in the calculator 102.

When the value y of the calculation result of the calculator 102 in step S11 is equal to the correct value Y, that is, when the calculator 102 operates normally, the function for normal operation is executed in step S14. The function for normal operation is a function that does not perform any process (a function that immediately returns to a caller). Thus, the present flow is immediately terminated.

When the value y of the calculation result of the calculator 102 in step S11 is not equal to the correct value Y, that is, when the calculator 102 operates abnormally, the function for abnormal operation is executed in step S14.

As described above, in step S14, different processes are consequently executed by determining whether or not the value y of the calculation result is equal to the correct value Y, without branching by using a comparing capability of the calculator 102.

Examples of the process of the function for abnormal operation include a process of resetting the microcomputer 100. When the abnormal operation of the calculator 102 is due to a temporary cause, the calculator 102 recovers and operates normally by resetting and restarting the microcomputer 100. Even when the calculator 102 abnormally operates due to a permanent malfunction and does not recover and operate normally, safety measures such as stopping operation of the microcomputer 100 and making an alert notification can be taken by operating other safety capabilities during the restart. Processes such as stopping a predetermined capability of the microcomputer 100 may be performed instead of resetting the microcomputer 100.

As in the present example, when the monitoring IC 130 monitors the microcomputer 100 based on the watchdog pulse output by the microcomputer 100, examples of the process of resetting the microcomputer 100 include a process of stopping the output of the watchdog pulse. In this case, the microcomputer 100 can exit the function for abnormal operation and continue various types of functional operation before the microcomputer 100 receives the reset signal from the monitoring IC 130. In addition to the process of stopping the output of the watchdog pulse, the microcomputer 100 may be prevented from interruption and enter an infinite loop. In this case, the microcomputer 100 can immediately stop various types of functional operation. Functional operation can be designed to be continued or immediately stopped based on safety, whether or not the influence due to abnormality in the calculator 102 is significant, or the like. The process of resetting the microcomputer 100 may be a process of jumping to a reset entry address such as the starting address of a start-up process. In this case, the microcomputer 100 is immediately initialized and restarted. The process can also be applied to a case where a configuration that monitors the watchdog pulse by the monitoring IC 130 or the like is not disposed. When the function for abnormal operation includes an infinite loop or the process of jumping to the reset entry address, the flow is not terminated in the form of an exit from the function for abnormal operation and is terminated in the form of a stoppage by resetting of the microcomputer 100.

The timing of performing the operation verification process is not limited. For example, the operation verification process may be performed each time or every predetermined number of times a periodic interruption process for transmitting the watchdog pulse to the monitoring IC 130 is performed, or may be performed at other timings.

The operation verification process may be periodically executed at all times or may be executed when a predetermined capability operates. In a device or a system having a plurality of microcomputers, all of the microcomputers may perform the operation verification process, or a part of the microcomputers having significant capabilities may perform the operation verification process. For example, in a vehicle-mounted system, a microcomputer of an ECU having a traveling capability may execute the operation verification process during traveling of the vehicle.

In the operation verification process of steps S11 to S14 described heretofore, the CPU 101, by using the relative address referencing capability thereof, can execute the process for normal operation when the calculation result of the calculator 102 matches the correct value, and can execute the process for abnormal operation when the calculation result of the calculator 102 does not match the correct value. Thus, the calculation result of the calculator 102 is not compared with the correct value by using a calculator of another microcomputer. As described above, since one microcomputer 100 can verify operation of the calculator 102 in a self-contained manner, communication between two microcomputers is not performed. Thus, the degree of freedom in execution timing is increased, and operation of the microcomputer 100 can be sufficiently ensured. A second microcomputer is not disposed for verification of the calculator 102, and cost reduction in the device or the entire system is easily achieved. The processing method can be applied to various devices or systems including a microcomputer.

Comparative Example

Figure 4:
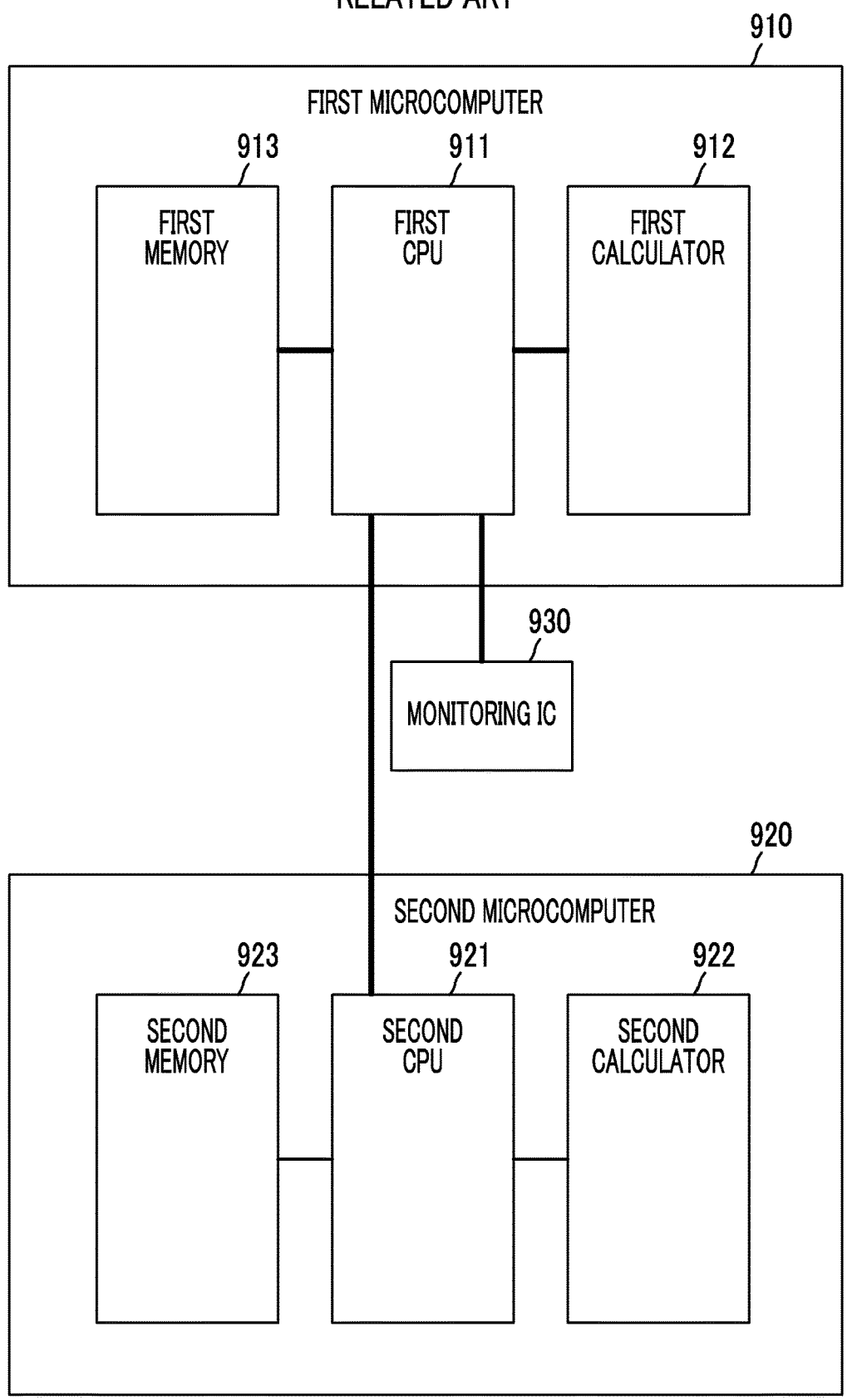
FIG. 4 is a functional block diagram of a device according to the related art.

Verification of operation of a first calculator 912 included in a first microcomputer 910 by a second microcomputer 920 in a device illustrated in FIG. 4 will be described for the purpose of comparison with the embodiment.

Figure 5:
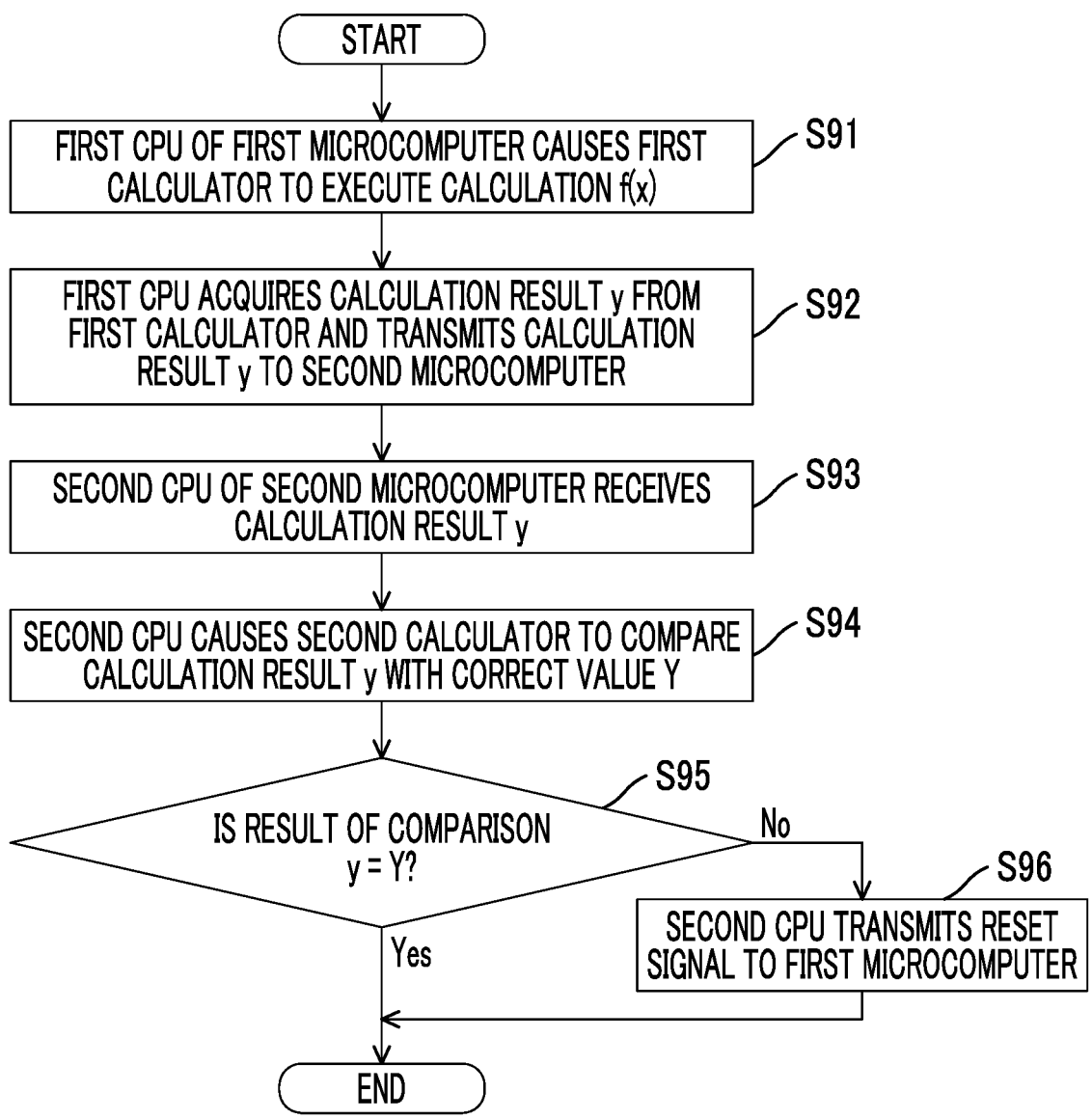
FIG. 5 is a flowchart of an operation verification process according to a comparative example.

In the present comparative example, the second microcomputer 920 causes a second calculator 922 to compare the calculation result of the first calculator 912 with the correct value. FIG. 5 illustrates a flowchart representing an operation verification process executed by a first CPU 911 and a second CPU 921. Hereinafter, each step of the flowchart will be described.

[Step S91]: The first CPU 911 of the first microcomputer 910 causes the first calculator 912 to execute the predetermined testing calculation f(x) (x is a predetermined parameter). [Step S92]: The first CPU 911 acquires the calculation result y of the first calculator 912 and transmits the calculation result y to the second microcomputer 920. [Step S93]: The second CPU 921 of the second microcomputer 920 receives the calculation result y. [Step S94]: The second CPU 921 causes the second calculator 922 to compare the calculation result y with the correct value Y in order to determine whether or not the calculation result y is equal to the correct value Y. The correct value Y may be the value of the result of execution of the calculation f(x) by the second calculator 922 or may be a predetermined value given in advance. [Step S95]: The second CPU 921 acquires the comparison result. When the calculation result y is equal to the correct value Y, the second CPU 921 terminates the process. When the calculation result y is not equal to the correct value Y, the second CPU 921 transitions to step S96. [Step S96]: The second CPU 921 transmits the reset signal to the first microcomputer 910 and terminates the process.

The method has many constituents, performs communication between two microcomputers, and causes each microcomputer to perform the process. Thus, many constraints are imposed on the execution timing, and operation of the first calculator 912 may not be sufficiently ensured. The method uses a second microcomputer, and cost reduction may not be achieved.

The disclosure is useful for various devices or systems including a microcomputer.

What is claimed is:

1. A method of ensuring operation of a microcomputer including a CPU, a memory, and calculator executed by the CPU,
where the memory: (a) stores, at a first address, a function for normal operation that immediately returns to a caller, (b) stores, at a second address, a function for abnormal operation that performs a process for abnormal operation that causes a reset of the microcomputer without using the calculator, and (c) stores, in a predetermined range of addresses beginning with a starting address, a first address pointer that points to the first address and a plurality of second address pointers that each point to the second address, the first address pointer being stored at a first address within the predetermined range, and the second address pointers being stored at all addresses within the predetermined range other than the first address within the predetermined range, where the first address within the predetermined range of addresses is equal to a sum of a predetermined value and the starting address of the predetermined range of addresses the method comprising causing, by the CPU, the calculator to perform a predetermined operation verification calculation to produce a resultant value, wherein the operation verification calculation is configured such that the resultant value is equal to the predetermined value when the predetermined operation verification calculation is correctly performed by the calculator and the resultant value is not equal to the predetermined value when the predetermined operation verification calculation is incorrectly performed by the calculator;

acquiring, by the CPU, the resultant value of the operation verification calculation performed by the calculator;

determining, by the CPU, a determined address within the predetermined range of addresses by adding the acquired resultant value to the starting address of the predetermined range of addresses;

retrieving whichever of the first address pointer and the second address pointer is stored at the determined address within the predetermined range of addresses; and executing, by the CPU, the function for normal operation stored at the first address when the first address pointer is retrieved, and the function for abnormal operation stored at the second address when the second address pointer is retrieved.

2. The method according to claim 1, wherein the function for abnormal operation includes jumping to a reset entry address for the microcomputer.

3. The method according to claim 1, wherein the microcomputer periodically outputs a watchdog pulse before the function for abnormal operation is performed, and the function for abnormal operation includes stopping the output of the watchdog pulse.

4. The method according to claim 3, wherein the function for abnormal operation further includes preventing interruption and entering an infinite loop.

5. The method according to claim 3, wherein the CPU is configured to periodically transmit the watchdog pulse to a monitoring IC including a watchdog timer when the microcomputer is operating normally, and the monitoring IC resets the watchdog timer when the monitoring IC receives the watchdog pulse.

6. The method according to claim 5, wherein when the CPU stops transmitting the watchdog pulse, the watchdog timer causes a timeout, and the monitoring IC transmits a reset signal to the microcomputer.

* * * * *